United States Patent Office 3,449,272
Patented June 10, 1969

3,449,272
THERMOSETTING COMPOSITION CONTAINING AN ACETALIZED POLYMER AND A POLYOL
Marco Wismer, Gibsonia, and John R. Peffer, Pittsburgh, Pa., assignors to PPG Industries, Inc., Pittsburgh, Pa., a corporation of Pennsylvania
No Drawing. Continuation-in-part of application Ser. No. 237,999, Nov. 15, 1962. This application Jan. 6, 1967, Ser. No. 607,657
Int. Cl. C08g *39/10;* C08f *27/10, 3/40*
U.S. Cl. 260—17.4                          21 Claims

ABSTRACT OF THE DISCLOSURE

Thermosetting coating and molding compositions in which a polyol is used to cross-link an acetalized polymer of acrolein or similar unsaturated aldehyde. The aldehyde polymer is made by vinyl polymerization and is acetalized after polymerization by reaction with a monohydric alcohol such as methanol or butanol. The polyol used has a hydroxyl value of from 40 to 1400 in the case of a coating composition and 100 to 1800 in the case of a molding composition. An acid catalyst is necessary with molding compositions and is desirable with coating compositions.

---

This application is a continuation-in-part of copending application Ser. No. 237,999, filed Nov. 15, 1962, and now abandoned, said Ser. No. 237,999 being a continuation-in-part of application Ser. No. 141,625, filed Sept. 29, 1961, which is now abandoned.

This invention relates to thermosetting compositions comprising a polyol and an alcohol-modified polymer of an unsaturated aldehyde.

The compositions of the instant invention have particular utility as coating compositions and molding compositions. They comprise certain monohydric alcohol-modified unsaturated aldehyde polymers, particularly acetals of vinyl polymerized acrolein or methacrolein polymers.

Unsaturated aldehyde polymers such as polyacrolein have long been known, but have not achieved wide commercial acceptance because of certain undesirable properties, such as insolubility in many solvents, brittleness, water sensitivity, poor chemical resistance and poor adhesion to many substrates.

It has now been discovered that compositions comprising an alcohol-modified vinyl-polymerized aldehyde polymer and a polyol cure to form extremely good films having excellent water resistance, flexibility, toughness, impact resistance and similar properties.

It has further been found that such compositions, when formulated from vinyl-polymerized aldehyde polymers produced using redox catalysts, can be molded in the presence of an acidic catalyst to produce fabricated products having outstanding properties; for example, such products have lighter densities than many of the well known molding materials while possessing equivalent or better impact strentgh.

In addition, unfilled fabricated products molded from these compositions possess outstanding arc resistance, in many instances greater than 120 seconds when measured by A.S.T.M. Method D–495–58T, and good electrical resistivity. On the other hand, products made from conventional phenolformaldehyde molding resins do not have good arc resistance but "track" instead, i.e., readily conduct electrical arcs across their surfaces.

The compositions of this invention comprise (1) an alcohol-modified, vinyl-polymerized polymer of an alpha, beta-unsaturated aldehyde and (2) a polyol, i.e., a compound having at least two hydroxyl groups per molecule. In order to achieve compositions of the desired properties, the polyol should have a hydroxyl value between about 40 and 1800; those compositions to be utilized in coatings should employ polyols having hydroxyl values between about 40 and about 1400 and preferably between 100 and 500, while the molding compositions preferably employ polyols of somewhat higher hydroxyl values, generally between about 100 and about 1800.

Coating compositions utilizing polyols in which the hydroxyl value is too low, that is, below about 40, result in films which are overly soft, while polyols having hydroxyl values of over about 1400 yield more brittle films having relatively poor impact resistance. Similarly, if the hydroxyl value of the polyol in the molding compositions as described herein is below about 100, the molded product produced therefrom tends to be somewhat soft and rubbery and excessive amounts of the polyol are required to achieve stoichiometric ratios. Polyols of maximum hydroxyl values, i.e., 1800 or sometimes higher, can be successfully employed in molding compositions.

"Hydroxyl value" as used herein is defined as the number of milligrams of KOH needed to neutralize the amount of acetic acid required to esterify the hydroxyl groups in 1 gram of sample. The hydroxyl value can be readily determined by dividing the molecular weight of the polyol into the product of the average number of hydroxyl groups per molecule and 56,100, as follows:

$$\text{Hydroxyl value} = \frac{56{,}100 \times \text{hydroxyl groups per molecule}}{\text{molecular weight of polyol}}$$

The higher the hydroxyl value the smaller the amount of polyol needed to obtain good films and moldings. Excessive polyol may tend to impart water sensitivity to films and molding made from these compositions. Stoichiometric reaction requires two hydroxyl groups per aldehyde group or alcohol-modified aldehyde group and thus the stoichiometric amount of polyol necessary for reacting with a given amount of alcohol-modified polymer can readily be ascertained from the amount of aldehyde employed or the carbonyl content of the polymer prior to reaction with the monohydroxy alcohol. For procedures which may be used to determine carbonyl content, reference is made to R. C. Schulz et al. Makromolekulare Chemie, volume 20, page 161, 1956, and W. Bryant et al., J.A.C.S., volume 57, page 57, 1935; carbonyl contents as reported herein were determined using the method described by Bryant et al.

The unsaturated aldehydes utilized to prepare the aldehyde polymers used in the compositions of this invention preferably are those having the structure:

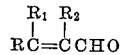

wherein R, $R_1$ and $R_2$ are hydrogen or lower alkyl radicals, especially those containing from 1 to 4 carbon atoms. Acrolein and methacrolein are particularly preferred aldehydes, but crotonaldehyde and others may also be utilized.

The term "polymer of an unsaturated aldehyde" and similar expressions used herein include not only homopolymers of the aldehyde but also copolymers of such aldehydes with one or more other monomers, the polymers in either event being vinyl-polymerized, that is, polymerized through the carbon to carbon unsaturated linkages and not through the aldehyde group. The copolymers which may be employed in the compositions of this invention are those containing substantial amounts of the unsaturated aldehyde in polymerized form, usually at least about percent or more, with at least one other ethylenically unsaturtaed monomer. Examples of such monomers include the following:

(1) Olefinic hydrocarbons, such as styrene, alpha-methyl styrene, isobutylene, 2,3-dimethyl-butene-1, 2,4-dimethyl-pentene-1, 2,3,3-trimethyl-butene-1, 2-methyl-heptene-1, 2,3-dimethyl-decene-1, 2-methylmonodecene-1, ethylene, propylene, butylene, amylene, hexylene, 1,3-butadiene, 2-methyl-1,3-butadiene, and the like;

(2) Halogenated olefinic hydrocarbons, that is, monomers containing carbon, hydrogen and one or more halogen atoms, such as alpha-chlorostyrene, alpha-bromostyrene, 2,5- dichlorostyrene, ortho-, meta-, and para-fluorostyrenes, dichloromonofluorostyrenes, 2 - chloropropene, 2-chlorobutene, 2-bromobutene, 2-fluorobutene, 2-iodopropene, 4-chloroheptene, cis- and trans-1,2-dichloroethylenes, vinyl chloride, vinylidene chloride, bromoethylene, fluoroethylene, iodoethylene, 1,1-dibromoethylene, 1,1,2,2-tetrachloroethylene, 2-chloro-1,3-butadiene (chloroprene) and 2,3-dichloro-1,3-butadiene;

(3) Esters of organic and inorganic acids, such as vinyl acetate, vinyl propionate, vinyl butyrate, vinyl caproate, vinyl benzoate, vinyl toluate, vinyl o-chlorobenzoate, vinyl p-methoxybenzoate, methyl methacrylate, butyl methacrylate, hexyl methacrylate, decyl methacrylate, methyl crotonate, ethyl crotonate, ethyl tiglate, methyl acrylate, ethyl acrylate, butyl acrylate, 2-ethylhexyl acrylate, 3,5,5-trimethylhexyl acrylate, decyl acrylate, dodecyl acrylate, isopropenyl acetate, isopropenyl benzoate, isopropenyl p-chlorobenzoate, isopropenyl toluate, vinyl alpha-chloroacetate, allyl chloride, allyl cyanide, allyl bromide, allyl thiocyanate, allyl acetate, allyl propionate, allyl butyrate, allyl benzoate, allyl acrylate, allyl chloropropionate, as well as methallyl esters corresponding to the above allyl esters and esters from such alkenyl alcohols as beta-ethyl allyl alcohol, methyl alpha-chloroacrylate, decyl alpha-chloroacrylate, methyl alpha-cyano acrylate, dimethyl maleate, diethyl maleate, diallyl maleate, dimethyl fumarate, diethyl fumarate, dimethyl allyl fumarate, and diethyl glutaconate;

(4) Organic nitriles, such as acrylonitrile, methacrylonitrile, ethacrylonitrile, crotonitrile, oleonitrile, and the like.

The polymer of the aldehyde, when used in coating compositions, can be made by known methods using conventional catalysts, including ionic catalysts, peroxide catalysts and redox catalysts. Thus there can be employed peroxide catalysts, such as benzoyl peroxide and cumene hydroperoxide, or azo catalysts, such as alpha, alpha'-azobis(isobutyronitrile), but it is preferred in many cases to use redox catalyst systems; as is more fully discussed hereinafter, it is essential that the polymer be redox-catalyzed when it is to be utilized in a molding composition.

Any of the well known methods of producing polymers of such aldehydes may be used. Redox-catalyzed polymers of unsaturated aldehydes prepared with any reduction-activated catalyst system, such as the following:

REDOX CATALYST SYSTEMS

| Oxidizing constituent | Reducing constituent |
| --- | --- |
| $H_2O_2$ | $Fe(NH_4)_2(SO_4)_2 \cdot 6H_2O$ |
| $K_2S_2O_8$ | $Fe(NH_4)_2(SO_4)_2 \cdot 6H_2O$ |
| $K_2S_2O_8$ | $AgNO_3$ |
| $K_2S_2O_8$ | $Na_2S_2O_5$ |
| $K_2S_2O_8$ | $Na_2SO_3$ |
| $Na_2S_2O_8$ | $Na_2S_2O_5$ |
| $K_2S_2O_8$ | $NaHSO_3$ |
| $K_2S_2O_8$ | $TiCl_3$ |
| $C_4H_{10}O_2$[1] | $Fe(NH_4)_2(SO_4)_2 \cdot 6H_2O$ |
| $C_4H_{10}O_2$[1] | $TiCl_3$ |
| $C_4H_{10}O_2$[1] | $AgNO_3$ |
| $C_4H_{10}O_2$[1] | $Na_2SO_3$ |

[1] Tertiary butyl hydroperoxide.

Redox or reduction-activated polymerizations are discussed in Vinyl and Related Polymers, Schildknecht (1952), pages 93–97, and in the references cited therein.

In preparing the redox-catalyzed unsaturated aldehyde polymers it is preferred to employ a redox-catalyzed system chosen from the above table, and the polymerization is generally carried out by simply adding the unsaturated aldehyde, with or without other unsaturated monomers, to the oxidizing component while keeping the temperature preferably below 20° C. After the addition is complete the reducing component is added. An exothermic reaction takes place, and the product is filtered and washed with water.

In order to be used in the thermosetting compositions as disclosed herein, the polymer of the unsaturtaed aldehyde is first formed and then alcohol-modified by reaction with a monohydroxy alcohol to form the acetal of at least some of the aldehyde groups of the polymer. In most instances the monohydroxy alcohol is one which has a boiling point below that which is used to cure the compositions of the instant invention. For example, methanol, ethanol, propanol, butanol, isobutanol and other lower alkanols of up to about 8 carbon atoms are preferred, but even though less desirable, higher monohydric alcohols may also be employed. This reaction is often carried out in the presence of an acid catalyst which may be any of those conventionally used for this purpose, such as mineral acids and organic substituted mineral acids.

In addition to the foregoing saturated monohydroxy alcohols it is in many instances desirable to react some of the aldehyde groups with an unsaturated alcohol to provide additional cross-linking sites on the polymer chain. Allyl alcohol and alpha-alkylallyl alcohols are particularly useful for this purpose. Other alcohols such as crotyl alcohol and cinnamyl alcohol may also be utilized.

The full acetal is often produced directly from the aldehyde groups of the polymer by reaction with the alcohol, but it is also possible to produce first the hemiacetal and then the full acetal. When this method is employed, the hemiacetal is usually obtained by polymerizing the aldehyde in an alcoholic medium, and the hemiacetal groups are subsequently further reacted with an alcohol, often in the presence of an acidic catalyst, to form acetal groups. The preparation of the polymer in an alcoholic medium to form the hemiacetal is described in U.S. Patent 2,657,192.

It is not always necessary to acetalize all the aldehyde groups in the polymer. Polymers usable for coating and molding compositions are also obtained by reacting only enough monohydric alcohol with the polymer to make it soluble in common organic solvents in the case of polymers to be employed in coating compositions, or fusible in the case of polymers intended for molding compositions. Partial acetalization of the aldehyde polymer decreases its active carbonyl content, although the maximum desirable carbonyl content varies with the nature of the polymer. Utilizing a homopolymer of acrolein or methacrolein, for example, the carbonyl content of the alcohol-modified polymer should be not greater than about 20 percent for fusibility, and not greater than about 15 percent for solubility. The similar values for copolymers are somewhat lower.

One advantage of partial acetalization is that less monohydric alcohol is evolved during the transacetalization or cross-linking which occurs during the curing of the composition. Thus, less volatile material is evolved from the coating or molded article and there is less likelihood of bubble formation or gas entrapment.

The cross-linking component of the thermosetting compositions of the invention is a polyol. Any polyhydroxy compound can be so employed, such as the various glycols, for example, hexamethylene glycol, butylene glycol, pentylene glycol and the like. It is preferred, however, to utilize a polyol containing more than two hydroxy groups, such as trimethylolpropane, trimethylolethane, mannitol, and other hydroxy-containing compounds which have a hydroxyl value within the aforesaid range, the preferred range depending upon the use to which the composition is to be put.

Among the polyols which are advantageously employed in the invention are polyoxypropylene derivatives of trimethylolpropane, known commercially as Pluracols.

The molecular weight of these materials varies from about 400 to about 4000 or higher, and they have a hydroxyl number of up to about 600.

Another class of preferred polyols are the reaction products of propylene oxide with an active hydrogen-containing copolymer of styrene and another monomer such as allyl alcohol.

In addition to the above polyols, other compounds such as various resins containing active hydrogen atoms in the form of hydroxy groups may be used. For instance, good compositions are obtained from polyester resins. There may also be employed hydroxyl-containing alkyd resins, as well as the reaction products of polyols wth drying oils and cyclopentadiene as disclosed in U.S. Patent 2,397,600, and the various hydroxyl-containing unsaturated aldehyde polymer derivatives described in U.S. Patent 2,809,186.

Other polyols found particularly useful in producing the compositions of this invention are polypropylene glycols and sucrose polyols prepared by reacting sucrose with an alkylene oxide or with several alkylene oxides.

An acid catalyst is preferably included in the various compositions of this invention, and is an essential ingredient when the compositiion is to be used for molding. The following acids are exemplary of those types which may be utilized:

(a) Mineral acids, such as hydrochloric acid, sulfuric acid, nitric acid, sulfurous acid, phosphoric acid, nitrous acid, phosphorous acid, chloric acid, permanganic acid, and the like;

(b) Organic acids, such as formic acid, acetic acid, propionic acid, valeric acid, caprylic acid, lauric acid, oxalic acid, malonic acid, methylmalonic acid, succinic acid, glutaric acid, maleic acid, fumaric acid, citraconic acid, itaconic acid, phthalic acid, benzoic acid, acrylic acid, methacrylic acid, crotonic acid, and the like;

(c) Organo-mineral acids, such as p-toluenesulfonic acid, monomethyl phosphonic acids, monopropyl phosphonic acid, isothionic acid, p-phenolsulfonic acid and the like; and (d) Lewis acids, such as stannic chloride, boron trifluoride, zinc chloride, aluminum chloride, aluminum sulfate, ferric chloride, ferric sulfate, and the like.

The compositions comprising an alcohol-modified polymer of an unsaturated aldehyde blended with a polyhydroxy compound which has a hydroxy value between about 40 and about 1400 provide coatings having excellent properties. When used in this manner, the compositions are applied from solution as a film to the desired surface. The films are preferably cured at temperatures ranging from 150° F. to 350° F., although they do cure slowly at ambient or room temperature and may be cured at temperatures as high as 550° F. or higher. While the films cure without a catalyst, an acidic catalyst of the class described above aids in obtaining faster cures and harder films.

The optimum proportions of the components in those compositions to be used for coatings depends upon the nature of the aldehyde polymer, e.g., its carbonyl content, as well as the hydroxyl value of the polyol. Generally, the compositions comprise between about 1 percent and about 40 percent by weight of the polyol and between about 99 percent and about 60 percent alcohol-modified polymer. If a catalyst is employed, it is usually present in an amount between about 0.1 percent and about 5.0 percent by weight, based upon the total weight of polymer and polyol.

In order to provide a coating composition which will have significant gloss subsequent to pigmentation and baking, it is advantageous to copolymerize about 0.5 percent to about 15 percent by weight, and preferably about 1.5 percent to about 3 percent, of an unsaturated carboxylic acid with the unsaturated aldehyde and any other monomer. Examples of the unsaturated carboxylic acids which are ordinarily used for this purpose include acrylic acid, methacrylic acid crotonic acid, 3-butenoic acid, angelic acid, tiglic acid and the like.

Those compositions of the invention which are made from redox-catalyzed aldehyde polymers can also be used for molding. The fact that the alcohol-modified redox-catalyzed polymers of unsaturated aldehydes can be advantageously blended with various polyols for molding purposes is entirely unexpected and surprising, especially since acetals of other types of polymers of such aldehydes, that is, the ionic and free radical catalyzed polymers, cannot be utilized because they fail to give molded articles which are rigid or which have a reasonable degree of toughness.

In addition to reactivity, the redox-catalyzed polymers when modified with alcohols have the required compatibility with polyols for obtaining a homogeneous molded article. Moreover, the blended compositions are stable and have an acceptable shelf life, even though the components react readily at elevated temperatures and are therefore readily adaptable to molding procedures, the complete molded article ordinarily being obtainable within about 2 minutes after the composition has entered the mold.

Molding compositions are best produced from aldehyde polymers of moderate molecular weight or higher, as evidenced by their intrinsic viscosities. It has been found that, to avoid brittleness in the molded article, the polymer employed should preferably have an intrinsic viscosity of .015 or higher, as measured in 5 percent aqueous NaCl solution containing 5 percent $SO_2$. All intrinsic viscosities mentioned herein were measured in this manner. The obtention of polymers of satisfactorily high intrinsic viscosities and molecular weight is aided by carrying out the polymerization using a relatively low concentration of catalyst, a low concentration of the monomer or monomers in the reaction mixture, and by cooling the reaction mass to maintain low temperatures during the reaction.

The compositions to be used for molding preferably comprise from 40 percent to 95 percent of the alcohol-modified, redox-catalyzed polymer of the unsaturated aldehyde and from about 5 percent to about 60 percent by weight of polyol, and it is preferred that the polymer of acrolein comprise from about 66 percent to about 91 percent by weight of the composition and the polyol about 9 percent to about 34 percent by weight. Included in the molding compositions as an essential ingredient is an acid catalyst of the class described above; the amount of catalyst depends upon its weight and activity as well as upon the aldehyde content of the polymer. Usually between about 0.1 percent and about 10 percent by weight based upon the weight of the aldehyde polymer is utilized.

The blending of the two components along with the acid catalyst may be carried out by various well known procedures, depending upon their physical properties and the desired particle size. It is preferred that the molding composition be a powder having a predominant amount of its particles falling within the −12 to +140 mesh size. For injection molding and extrusion molding, extremly coarse particles, about 4 mesh, are desirable.

It is an advantage of the instant invention that the compositions can be molded at mild molding conditions, generally falling within the temperature range of 200° F. to 310° F., and preferably 230° F. to 300° F., and at pressures of 500 p.s.i. to 9000 p.s.i. and preferably about 1500 p.s.i. to 3000 p.s.i. These pressures and temperatures are ordinarily maintained for about 30 seconds to 10 minutes. The resulting molded article is homogeneous, has a high dielectric constant and excellent arc resistance and may be used safely as a substitute for phenol-formaldehyde resins in the construction of electrical devices where high voltages are employed.

Moreover, the compositions of the instant invention produce moldings of high impact strength and may be used as a substitute for melamine-formaldehyde molding powders, especially where a low density material is desirable. Because of their low density, the molded articles are buoyant in salt water, whereas the great majority of other molded articles are not.

While the molding compositions of the instant invention may be used advantageously without the use of a filler, a filler may sometimes be desirable, especially when the polyol is a liquid and a molding powder is desired. Various fillers, particularly the cellulosic type, may be advantageously employed, there being a certain amount of reaction between the aldehyde groups and the hydroxyl groups of the cellulosic material. Other fillers which may be employed include diatomaceous earth (keiselguhr), talc, wood flour, cotton floc, fiber glass, dried clay such as kaolin, montmorillonite, various forms of silica, asbestos, mica, glass fibers, and the like, as well as organic fillers such as synthetic fibers, particularly polyester fibers, polyamide fibers, and polyacrylonitrile fibers. Even when a filler is not employed, it is often advantageous to incorporate small amounts of an anticaking agent into the molding composition if a free-flowing powder is desired. The low density colloidal silica gel known commercially as Cab-O-Sil is particularly satisfactory for this purpose, but other similar materials, such as talc, can also be used.

Various synthetic polymeric materials can also be added to the composition, such as epoxy resins, vinyl polymers and copolymers, saturated and unsaturated polyesters, polyamides, and the like. Naturally occurring polymers, such as rosin, rubber and similar materials, are also useful as additives.

These molding compositions are also useful to laminate such reinforcing materials as fiber glass cloth, saturated polyester fibers and films, and the like. Of particular utility for lamination are cellulosic materials such as cotton cloth and paper; laminates can be prepared using these hydroxyl-containing materials as the polyol along with an alcohol-modified redox-catalyzed unsaturated aldehyde polymer and an acid catalyst of the type described hereinabove, often without utilizing any additional polyol.

The invention will further be described with reference to several specific examples thereof, which, however, should not be construed as limiting the various embodiments of the invention to their details. It is pertinent to note that in all the acetalized polymer preparations described, excellent overall yields (at least 80 percent and generally higher) of the alcohol-modified products were obtained.

Among the polyols used in the examples described below were those of the following composition:

"Sucrose polyol" is the reaction product of 1 mole of sucrose, 11 moles of propylene oxide and 4 moles of ethylene oxide, with a hydroxyl value of 450 to 470 and a viscosity of 25,000 to 30,000 centipoises at 25° C.

"Pluracol TP-440" is a polyoxypropylene derivative of trimethylolpropane having a molecular weight of 418 and a hydroxyl value of 404.

"Pluracol TP-740" is a similar product having a molecular weight of 732 and a hydroxyl value of 230.

"Shell X-450" is a styrene-allyl alcohol copolymer having a hydroxyl value of 255.

"Shell E-47" is the reaction product of propylene oxide with an active hydrogen-containing copolymer of styrene and allyl alcohol; it has a hydroxyl value of 164.

"ER-6804" is a polyester produced from 1,3-butanediol, trimethylolpropane, phthalic anhydride and adipic acid, having a hydroxyl value of 145.1 and an acid number of 14-20.

"PPG-2025" is polypropylene glycol having a molecular weight of about 2000 and a hydroxyl value of 50-60.

"PPG-750" is polypropylene glycol having a molecular weight of about 750 and a hydroxyl value of about 150.

EXAMPLES 1 TO 11

Several polymers of unsaturated aldehydes useful for use in coating compositions were prepared as follows:

Polymer A

To a mixture of 3,000 parts of distilled water and 500 parts of distilled acrolein there were added 45.7 parts of $K_2S_2O_8$. The mass was cooled to 5° C. and 34.2 parts of silver nitrate in 50 parts of distilled water were added over a period of 5 minutes. The reaction temperature rose to 21° C. in fifteen minutes, which was the maximum temperature with external cooling. The reaction was continued for four hours, after which the mixture was washed with water four times and then with $Na_2S_2O_3$ solution. After filtration and drying under vacuum, there was obtained a 95 percent yield of polyacrolein having a carbonyl content of 26 percent and an intrinsic viscosity of 0.02.

A mixture of 97.5 parts of the polyacrolein thus prepared, 250 parts of n-butanol and 88 parts of xylene was stirred and refluxed for 5 hours until reaction temperature reached 114° C., while removing the water of reaction as a xylene azeotrope. The reaction mass was cooled to room temperature and centrifuged; the supernatant liquid was filtered under pressure through Celite. The butanol-modified polyacrolein solution thus obtained had a solids content of 33.4 percent.

Polymer B

A glass reaction vessel was charged with the following:

| | Grams |
|---|---|
| Acrolein | 520 |
| 2-Ethylhexyl acrylate | 260 |
| Ethyl acrylate | 520 |
| Acrylic acid | 26 |
| Benzoyl peroxide | 26 |
| n-Butanol | 1782 |

The mixture was heated to reflux for about 14 hours, with additional 15 gram portions of benzoyl peroxide being added after the 12th hour and again after 13 hours. During the reaction, 700 milliliters of butanol were removed by distillation. To the resulting solution, 500 milliliters of butanol were added, whereupon the solution had a carbonyl content of 8.8 percent (40 percent solids).

The foregoing polymeric product was comprised of the butyl hemiacetal of the copolymer of acrolein. This was converted to the full acetal by heating 1200 grams of the above 40 percent solution to reflux temperature while adding a total of 0.48 gram of p-toluenesulfonic acid dissolved in 30 milliliters of butanol in small increments over a period of about 7 hours. Water evolved from the reaction mixture during the course of the reaction and about 55 milliliters of toluene were added to replace the water. The product, which had a carbonyl content of 1.9 percent based on 40 percent solids, was dried by distilling off the butanol and heating the viscous residue under vacuum.

Polymer C

A reaction flask was charged with 750 milliliters of distilled water, 11.8 grams of potassium persulfate, and 20 grams of an emulsifier comprised of polyethylene glycol of molecular weight of about 20,000. To this mixture there were added 360 grams of acrolein, 90 grams of butyl acrylate and 0.2 gram of silver nitrate dissolved in 5 milliliters of water. A solution of 4.3 grams of sodium bisulfite in 200 milliliters of water then added to the stirred reaction mass over a 3-hour period while the temperature was maintained at 10° C. After completion of the bisulfite addition, the temperature was raised to 20° C. and agitation was continued for another 10 hours. during which time the reaction mixture solidified and the temperature gradually rose to 65° C. After cooling, the solid white reaction product was washed with 5 percent sulfuric acid solution and then washed with water until the washings were no longer acid. After drying, the copolymer produced had an intrinsic viscosity of 0.048 and a carbonyl content of 25.5 percent.

A mixture of 750 parts of the above copolymer, 7000 parts of n-butanol and 85 parts of toluene was refluxed for 4 hours during which time it became homogeneous and evolved water. During this time an additional 1000 parts of n-butanol were added to the mixture, which had Solvent resistance was determined by rubbing a cloth impregnated with xylene over the film forty times at room temperature. The solvent resistance is "good" if no softening or lifting of the film occurs. If a slight softening takes place, the solvent resistance is considered to be "fair."

Table I below sets forth the compositions and test results comprising these examples.

TABLE I

| Ex. No. | Aldehyde polymer | Polyol | Amt. polyol (weight percent) | Catalyst | Catalyst conc. (weight percent) | Bond | Sward hardness | Impact (inch-lbs.) direct | Impact (inch-lbs.) indirect | Solvent resistance |
|---|---|---|---|---|---|---|---|---|---|---|
| 1 | A | Sucrose polyol | 6.8 | p-Toluene-sulfonic acid | 0.5 | Good | 38 | 24 | 48 | Good. |
| 8 | A | Pluracol TP-440 | 8.3 | p-Toluene-sulfonic acid | 0.5 | do | 44 | 96 | 64 | Do. |
| 9 | A | ER-6804 | 24.7 | p-Toluene-sulfonic acid | 0.3 | do | 22 | 96 | 96 | Do. |
| 4 | B | Trimethylolpropane | 16.3 | $H_3PO_4$ | 0.7 | do | 20 | 96 | 96 | Do. |
| 3 | B | Shell X-450 | 16.1 | $H_3PO_4$ | 1.6 | do | 32 | 96 | 96 | Do. |
| 7 | B | Shell E-47 | 16.3 | None | | do | 8 | 82 | 96 | Fair. |
| 2 | B | Trimethylolpropane | 16.3 | $ZnCl_2$ | 0.7 | do | 26 | 96 | 96 | Good. |
| 5 | C | Pluracol TP-0 | 20.0 | None | | do | 10 | 96 | 96 | Fair. |
| 1 | C | Pluracol TP-0 | 19.7 | Oxalic acid | 0.8 | do | 26 | 24 | 96 | Do. |
| 60 | D | PPG-2025 | 27.0 | p-Toluene-sulfonic acid | 0.7 | do | 36 | 96 | 96 | Good. |
| 11 | D | Pluracol TP-0 | 8.0 | Trichloroacetic acid | 1.0 | do | 48 | 96 | 96 | Do. | become more viscous, to promote better mixing. After filtering the mixture under pressure, about 6000 parts of solvent were stripped off and the resulting concentrate was added with stirring to 2000 parts of methanol. The solide product which precipitated, after drying, had a carbonyl content of 0.7 percent.

Polymer D

A mixture of 500 parts of distilled acrolein and 3000 parts of distilled water was mixed with 45.7 parts of $K_2S_2O_8$. A solution of 34.2 parts of silver nitrate in 50 parts of distilled water was added to the mixture over a period of 5 minutes while cooling the mass to maintain the temperature at a maximum of 21° C. After washing with water four times and then with $Na_2S_2O_3$ solution, the product was filtered and dried under vacuum. The polyacrolein thus produced was reacted with methanol by refluxing a mixture of 50 parts of the polyacrolein, 400 parts of methanol and 1 part p-toluenesulfonic acid at 66° C. with agitation until the mixture was homogeneous. After the mixture had settled at room temperature for 2 hours the top layer was decanted and centrifuged. The liquid phase (383 parts) was stripped to 145 parts and this concentrate was added slowly with agitation to 500 parts of distilled water. The precipitate which formed was washed twice with distilled water and dried under vacuum. The product had a carbonyl content of 4.6 percent.

Using the polymers described above, coating compositions were produced by blending solutions of the polymer and a polyol, using common organic solvents in which they are soluble. If a catalyst was employed in the composition, it was also mixed with the other components. A three-mil film was then drawn on a phosphatized steel panel (Bonderite 1000) and cured at 350° F. for ½ hour. The properties of the film were then determined using standard tests as follows:

Bend strength was measured by the mandrel bend test, which comprises placing the coated panel on a standard conical mandrel and rolling and bending the mandrel intimately around the cone. In order to achieve a grading of "good," the coating must not peel from the tapered end of the cone.

Hardness was determined using the Sward rocker test in which the ratings express the hardness of the coating in terms of its percentage of the hardness of plate glass.

The impact strength was tested using a Gardner Variable Impact Tester in which a weight is dropped into the panel from varying heights until the coating fails as evidenced by cracks radiating from the point of impact. In this procedure direct impact is tested by dropping the weight directly onto the film, and indirect impact is determined by dropping the weight onto the back of the panel.

EXAMPLES 12 TO 26

The following examples illustrate the manner in which redox-catalyzed polymers of unsaturated aldehydes can be employed to produce molding compositions and the manner in which these compositions can be molded to produce moldings having exceptionally good properties. In these examples, the unsaturated aldehyde polymers described as polymers E to J were prepared as follows:

Polymer E

A solution of 88.25 parts of potassium persulfate in 5625 milliliters of distilled water was added to a reaction vessel, blanketed with nitrogen and 3000 parts of acrolein added. A solution of 1.2 parts of silver nitrate in 75 parts of water was then added and the mixture stirred while 32.25 parts of sodium bisulfite in 1875 parts of water were slowly added over a 3½ hour period, the temperature being maintained at 10° C. After completion of the bisulfite addition, the temperature was raised to 20° C. and the mixture was stirred for another 10 hours, during which time the reaction mass solidified and the temperature gradually rose to 65° C. After cooling, the solid white material remaining was washed with 5 percent sulfuric acid solution and filtered. The filter cake was washed with water until the washings were no longer acid and the resulting product was vacuum dried to a water content of 0.9 percent. The polyacrolein thus obtained had an intrinsic viscosity of 0.048 and a carbonyl content of 20.7 percent.

A mixture of 750 parts of the polyacrolein thus produced, 7000 parts of n-butanol and 85 parts of xylene were heated to reflux temperature, whereupon it evolved water and became more viscous. An additional 1000 parts of n-butanol was added and refluxing was continued for about 4 hours. The mixture was then filtered under pressure to remove the solids residue and about 6000 parts of solvent was stripped off under vacuum. The resulting concentrate was added with stirring to 2500 milliliters of methanol whereupon a solid precipitate separated from the solvent and was recovered by decantation. This solid product after drying had a carbonyl content of about 0.7 percent.

Polymer F

Acrolein was polymerized as in the preparation of the foregoing Polymer E. A mixture of 350 parts of the polyacrolein, 3500 parts of methanol and 3.5 parts of p-toluenesulfonic acid was refluxed at 66° C. for 2 hours. Upon cooling of the reaction mass, the bottom layer was separated and washed three times with methanol, dried at room temperature under 10 millimeters pressure and pulverized. The resultant product had a carbonyl content of 3.88 percent.

Polymer G

A solution made from 15.6 parts of potassium persulfate in 66.6 parts of polyethylene glycol (Dow E-20,000) and 1000 parts of water in a glass reaction vessel under a nitrogen atmosphere. There were then added 336 parts of acrolein and 86 parts of 2-ethylhexyl acrylate and the mixture maintained at about 20° C. while an aqueous solution of 0.2 part of silver nitrate in 40 parts of distilled water was added. While still maintaining the temperature at about 20° C. there was added over a period of 3 hours a solution of 5.8 parts of sodium bisulfite in 330 parts of distilled water. Stirring was continued, and about 5 hours after the sodium bisulfite addition had been completed, the mixture solidified. The solid reaction product, after washing with distilled water to remove residual catalyst, had a carbonyl content of 20.5 percent.

The crude undried copolymer thus obtained was reacted with butanol by refluxing a mixture of 662 grams of the crude copolymer with 1000 milliliters of n-butanol and 150 milliliters of xylene for 30 hours while removing the water of reaction. The clear brown supernatant liquid obtained was separated from the solid residue by decantation and concentrated to a volume of about 4000 milliliters by vacuum distillation. It was then added to 1200 milliliters of methanol, centrifuged and the precipitate dried under vacuum and ground to a fine powder. The product had a carbonyl content of 2.67 percent.

Polymer H

In a glass reactor there were mixed 2750 parts of distilled water, 2.5 parts of tetraethylorthosilicate, 600 parts of potassium persulfate and 414 parts of methacrolein. After the reactants were thoroughly mixed, the temperature was maintained at 25° C. without additional stirring for about 20 hours. Sodium sulfate was then added and the reaction mixture was filtered and the solid precipitate washed with water and methanol. A portion of the wet filter cake weighing 220 grams was then mixed with 1000 milliliters of n-butanol and 100 milliliters of toluene. To this mixture, 10 milliliters of a 1 percent methanol solution of 4,4′-methylene-bis(2,6-ditertiarybutyl)phenyl was added and the reaction mass heated to reflux temperature and maintained at that temperature for about 19 hours. During the course of the reaction the water evolved was removed and about 3 grams of p-toluene sulfonic acid were added; the reaction mixture changed to a clear solution. About 150 milliliters of toluene were added to make up distillation losses. The clear polymer solution obtained was mixed with an excess of methanol, whereupon the polymeric product precipitated and was collected by filtration, dried under vacuum and ground into a fine powder. It had a carbonyl content of about 1 percent.

Polymer I

Acrolein was polymerized in the manner used in producing Polymer E above. A glass reaction vessel was charged with 5500 grams of the crude polyacrolein filter cake, 5500 milliliters of n-butanol and 250 milliliters of xylene. The mixture was stirred under reflux for about 10 hours, during which time the water of reaction was removed by azeotropic distillation and the solvents and water removed replaced with 1000 milliliters of butanol and 550 milliliters of xylene. At the end of this period the reaction mixture became homogeneous, gelatinous and clear. The reaction product, which was recovered by vacuum drying, had a carbonyl content of 3.5 percent.

Polymer J

Two hundred and fifty (250) parts distilled acrolein were added to a solution of 22.8 parts of potassium persulfate in 1500 parts of water. A solution of 17.1 parts of silver nitrate and 50 parts of water was then added to the reaction mass slowly over a 2-minute period, while maintaining the reaction temperature between about 16° C. and 30° C. After 1½ hours, the product mixture was washed several times with water and finally with $Na_2S_2O_3$ solution, and then filtered and dried. Fifty parts of the polyacrolein thus produced, which had a carbonyl content of 38.8 percent, were mixed with 400 parts of methanol and 1 part p-toluenesulfonic acid and refluxed at 66° C. with constant agitation until the mixture was homogeneous. It was then allowed to settle at room temperature for 2 hours and the top layer decanted and centrifuged. The liquid phase (383 parts) was concentrated to 145 parts and then added slowly with agitation to 500 parts of distilled water. The precipitate which was formed was recovered by filtration, washed twice with distilled water and dried. The product had a carbonyl content of 2.1 percent.

Using the polymers produced above, molding compositions were prepared by mixing, generally by grinding, the aldehyde polymer, the polyol and an acid catalyst. The molding composition was then placed in a hot mold at the desired temperature and pressure for the specified length of time. Table II below sets forth the data with regard to the molding of these examples.

TABLE II

| Ex. No. | Aldehyde polymer | Parts | Polyol | Parts | Catalyst | Parts | Anti-caking agent or filler | Parts | Mold conditions | | |
|---|---|---|---|---|---|---|---|---|---|---|---|
| | | | | | | | | | Temp. (° F.) | Press. (p.s.i.) | Time (min.) |
| 12 | E | 5.1 | Trimethylolpropane | 1.0 | Oxalic acid | 0.05 | {Cab-O-Sil / Wood-flour} | {0.02 / 1.85} | 290 | 2,500 | 4.5 |
| 13 | E | 5.3 | {Sucrose polyl / Trimethylolpropane} | {0.8 / 1.8} | do | 0.8 | Cab-O-Sil | 0.04 | 290 | 2,500 | 5 |
| 14 | E | 19.3 | Trimethylolpropane | 6.4 | do | 0.2 | do | 0.05 | 250 | 3,000 | 8 |
| 15 | F | 14.6 | Trimethylolethane | 6.3 | p-Toluene-sulfonic acid | 0.15 | None | | 230 | 3,500 | 3 |
| 16 | F | 21.4 | Trimethylolpropane | 4.3 | Oxalic acid | 0.4 | Cab-O-Sil | 0.10 | 250 | 3,500 | 8 |
| 17 | F | 4.7 | Pluracol TP-740 | 2.3 | do | 0.1 | do | 0.10 | 275 | 2,500 | 5 |
| 18 | F | 5.6 | ER-6804 | 1.4 | do | 0.1 | do | 0.02 | 275 | 2,500 | 5 |
| 19 | G | 5.3 | Trimethylolpropane | 1.7 | do | 0.1 | do | 0.05 | 290 | 2,500 | 4.5 |
| 20 | H | 8.0 | {Trimethylolpropane / Pluracol TP-740} | {1.0 / 1.0} | p-Toluene-sulfonic acid | 0.1 | do | 0.05 | 350 | 2,500 | 5 |
| 21 | H | 8.0 | Pluracol TP-740 | 2.0 | do | 0.1 | do | 0.05 | 350 | 2,500 | 5 |
| 22 | I | 320.0 | Trimethylolpropane | 80.0 | Oxalic acid | 3.3 | do | 1.30 | 275 | 2,080 | 8 |
| 23 | I | 306.0 | do | 76.0 | do | 2.9 | do | 1.10 | 275 | 2,080 | 8 |
| 24 | J | 5.6 | Pluracol TP-740 | 1.4 | do | 0.1 | do | 0.02 | 275 | 2,500 | 5 |
| 25 | J | 5.6 | {Pluracol TP-740 / PPG-750} | {0.4 / 1.0} | do | 0.1 | do | 0.02 | 275 | 2,500 | 5 |
| 26 | J | 5.6 | PPG-750 | 1.4 | do | 0.1 | do | 0.02 | 275 | 2,500 | 5 |

The moldings produced in these examples all had acceptable properties, and in most instances provided outstandingly advantageous properties over those produced from molding compositions known heretofore. The densities of the moldings produced were relatively low, generally ranging from about 0.9 to 1.2 grams per cubic centimeter of mold volume. The impact strengths of the moldings were found to be high, for example, the molding made in Example 19 had an impact strength of 0.391 foot-pounds per inch of notch, as measured by test method A.S.T.M. D–256. Similarly, the flexural strengths of the moldings were excellent, for instance, Example 22 produced a molding having a flexural strength of 3650 p.s.i. as measured by test method A.S.T.M. D–790. Furthermore, as noted above, the molding compositions of this invention have outstanding arc resistance and this property was demonstrated by the moldings of these examples; thus, the molding of Example 23 had an arc resistance of 133 seconds as measured by A.S.T.M. D–495–58T.

The methyl acetal of acrolein was somewhat more easily polymerized although yields of polymer were quite low. The data for these are given in Table III.

TABLE III.—POLYMERIZATION OF METHYL ALCOHOL ACETAL OF ACROLEIN

| Polymer | Polymerization method | Catalyst | Comonomer | Yield,[1] percent |
|---|---|---|---|---|
| W | Bulk | Azobis(isobutyronitrile) | None | 12.5 |
| X | Solution | do | do | 1–2 |
| Y | do | do | Vinyl acetate | 14 |
| Z | Bulk | Benzoyl peroxide | Methyl methacrylate | 21 |

[1] Maximum based on total non-volatile solids in product.

Still other tests have demonstrated that polymers of unsaturated aldehydes made using other types of catalysts cannot be used for molding, and that articles molded from compositions embodying such polymers are wholly unsatisfactory. For instance, it was found that acrolein which had been polymerized using free radical catalysts was unusable for molding compositions, whether the polyacrolein was unmodified or alcohol-modified.

For example, moldings were produced from compositions of benzoyl peroxide-catalyzed polyacrolein and trimethylolpropane, along with p-toluenesulfonic acid and oxalic acid catalysts. Using proportions and molding conditions substantially similar to those in the above examples, the moldings thus produced from butanol-modified polyacrolein were soft, sticky, shapeless masses, while those made from unmodified polyacrolein were too fragile to withstand normal handling and had to be removed from the mold in pieces. Similarly unsatisfactory results were obtained using polymers of unsaturated aldehydes made with cationic type catalysts, such as boron trifluoride.

It has also been found that the carbonyl content of the alcohol-modified unsaturated aldehyde polymer is correlated to the desirability of the polymer in molding compositions. This was shown in a series of tests in which butanol-modified polyacrolein was molded with trimethylolpropane and oxalic acid in the manner of the foregoing examples. It was found that butanol-modified polyacrolein having a carbonyl content of 20 percent or above produced relatively unsatisfactory moldings, whereas polyacrolein of less than 20 percent carbonyl content produced satisfactory moldings.

As indicated above, it is important that the alcohol-modified aldehyde polymer be made by first polymerizing the aldehyde and any comonomers and then reacting the polymer to obtain the acetal. If the acetal is made first and then polymerized, as has been suggested, for example, in U.S. Patent 2,467,430, it is very difficult to obtain any appreciable yield of polymer, this being especially true in the case of certain of the preferred products herein. Furthermore, even when such polymers are obtained, crosslinking with polyols as in the present invention does not appear to take place to a degree sufficient to give products of adequate properties.

Demonstrating the necessity for producing the alcohol-modified polymers in the aforesaid manner were tests in which attempts were made to prepare and polymerize monohydric alcohol acetals of acrolein and to evaluate the properties of those polymers which could be produced. The procedure employed was that described in the examples of U.S. 2,467,430, with additional attempts being made where indicated using modifications in accordance with accepted practice in producing polymers of this type. It was found that no polymer could be isolated from attempted polymerization of the butyl acetal of acrolein; attempts were made using bulk polymerization as well as solution polymerization in benzene, and using various catalysts.

The properties of the above polymers obtained from acrolein dimethyl acetal were inferior, as shown by tests in which the acetalized polymer was mixed with Pluracol TP–440 and 0.5 percent by weight (based on the total of polymer and polyol) of p-toluenesulfonic acid. Films were drawn on phosphatized steel panels using a 3 mil drawdown bar, baked for 30 minutes at 250° F., and tested as above. The data are in Table IV.

TABLE IV

| Polymer | Polymer/polyol weight ratio | Bend | Sward hardness | Impact resistance, (inch-lbs.) | | Solvent resistance |
|---|---|---|---|---|---|---|
| | | | | Direct | Indirect | |
| W | 4/1 | Good | 10 | 80 | 80 | Failed. |
| W | 2/1 | do | 6–8 | 80 | 80 | Poor. |
| W [1] | 2/1 | do | 8 | 80 | 80 | Do. |
| X | (²) | (²) | (²) | (²) | (²) | (²). |
| Y | 4/1 | Good | (³) | 12 | 10 | Poor. |
| Z | 4/1 | Fair | 31 | 12 | 0–2 | Good. |

[1] Postbaked for 60 minutes at 250° F. and 30 minutes at 300° F.
[2] Insufficient for testing.
[3] Film too rough for test.

As indicated by the data, each of the films was deficient in one or more necessary properties, this being generally attributable to lack of adequate cross-linking in the cured product.

According to the provisions of the patent statutes, there are described above the invention and what are now considered to be its best embodiments. However, within the scope of the appended claims it is to be understood that the invention may be practiced otherwise than as specifically described.

We claim:
1. A thermosetting composition consisting essentially of
   (a) an acetalized polymer produced by vinyl polymerization of an alpha, beta-ethylenically unsaturated aldehyde and reaction of the major proportion of the aldehyde groups of the polymer thus formed with a monohydric alcohol to provide an acetalized polymer having a carbonyl content below about 20 percent, and
   (b) a polyol having hydroxyl value between about 40 and about 1800.

2. The composition of claim 1 in which said polymer is a copolymer of said aldehyde and at least one other ethylenically unsaturated monomer, said copolymer containing at least about 20 percent by weight of said aldehyde in polymerized form.

3. The composition of claim 1 in which said aldehyde is acrolein.

4. The composition of claim 1 in which said polyol is trimethylolpropane.

5. The composition of claim 1 in which the polyol is the reaction product of trimethylolpropane and propylene oxide.

6. The composition of claim 1 in which the polyol is an alkyd resin.

7. The composition of claim 1 in which said polyol is the reaction product of propylene oxide and a copoylmer of styrene and an active hydrogen-containing monomer.

8. The composition of claim 1 in which the polyol is a polyester resin.

9. The composition of claim 1 in which the polyol is a reaction product of sucrose, ethylene oxide and propylene oxide.

10. A thermosetting coating composition consisting essentially of
(a) an acetalized polymer produced by the vinyl polymerization of an alpha, beta-ethylenically unsaturated aldehyde and reaction of the major proportion of the aldehyde groups of the polymer thus formed with a monohydric alcohol to provide an acetalized polymer having a carbonyl content below about 15 percent, and
(b) a polyol having a hydroxyl value between about 40 and about 1400.

11. The composition of claim 10 in which said polymer is a copolymer of said aldehyde and at least one other ethylenically unsaturated monomer, said copoylmer containing at least about 20 percent by weight of said aldehyde in polymerized form.

12. The composition of claim 10 in which there is included an acid catalyst.

13. The composition of claim 11 in which the copolymer includes between about 0.5 and about 15 percent by weight of an unsaturated carboxylic acid.

14. A thermosetting molding composition consisting essentially of
(a) an acetalized polymer produced by vinyl polymerization of an alpha, beta-ethylenically unsaturated aldehyde using a redox catalyst system and reaction of the major proportion of the aldehyde groups of the polymer thus formed with a monohydric alcohol to provide an acetalized polymer having a carbonyl content below about 20 percent,
(b) a polyol having a hydroxyl value between about 100 and 1800, and
(c) an acid catalyst.

15. The composition of claim 14 in which said polymer is a copolymer of said aldehyde and at least one other ethylenically unsaturated monomer, said copolymer containing at least about 20 percent by weight of said aldehyde in polymerized form.

16. The composition of claim 14 containing from about 40 percent to about 95 percent by weight of said polymer, from about 5 percent to about 60 percent by weight of said polyol, and from about 0.1 percent to about 5 percent, based on the total weight of polymer and polyol, of said acid catalyst.

17. The composition of claim 16 in which said polymer has an intrinsic viscosity of at least about 0.015.

18. A molded article comprising the cured molding composition of claim 14.

19. A method of producing a thermosetting composition which comprises
(a) vinyl polymerizing an alpha, beta ethylenically unsaturated aldehyde,
(b) reacting the major porportion of the aldehyde groups of the polymer thus formed with the monohydric alcohol, to produce an acetalized polymer having a carbonyl content below about 20 percent, and
(c) mixing said acetalized polymer with a polyol having a hydroxyl value between about 40 and about 1800.

20. The method of claim 19 in which said polymer is a copolymer of at least about 20 percent by weight of said aldehyde with one or more other ethylenically unsaturated monomers.

21. The method of claim 19 in which said polymerization is carried out using a redox catalyst.

References Cited

UNITED STATES PATENTS 2,467,430 4/1949 Izard.
2,657,192 10/1953 Miller et al.
3,000,862 9/1961 Eifert et al.

WILLIAM H. SHORT, *Primary Examiner.*

E. A. NIELSEN, *Assistant Examiner.*

U.S. Cl. X.R.

260—67, 836, 873, 874